United States Patent
Zhou

(10) Patent No.: US 10,817,415 B2
(45) Date of Patent: Oct. 27, 2020

(54) DATA STORAGE DEVICE AND METHOD INCLUDING DEVICE OR CONTROLLER-BASED SPACE ALLOCATION AND HOST-BASED MAPPING TABLE SEARCHING

(71) Applicant: Shannon Systems Ltd., Shanghai (CN)

(72) Inventor: Zhen Zhou, Shanghai (CN)

(73) Assignee: SHANNON SYSTEMS LTD., Shanghai (CN)

( * ) Notice: Subject to any disclaimer, the term of this patent is extended or adjusted under 35 U.S.C. 154(b) by 22 days.

(21) Appl. No.: 15/956,985

(22) Filed: Apr. 19, 2018

(65) Prior Publication Data

US 2019/0102291 A1    Apr. 4, 2019

(30) Foreign Application Priority Data

Sep. 29, 2017   (CN) .......................... 2017 1 0907869

(51) Int. Cl.
*G06F 12/02*  (2006.01)
*G06F 3/06*  (2006.01)
*G06F 13/28*  (2006.01)

(52) U.S. Cl.
CPC .......... *G06F 12/0246* (2013.01); *G06F 3/064* (2013.01); *G06F 3/0607* (2013.01);
(Continued)

(58) Field of Classification Search
CPC ............. G06F 12/0246; G06F 12/0253; G06F 12/0292; G06F 3/0631; G06F 3/0659;
(Continued)

(56) References Cited

U.S. PATENT DOCUMENTS

2014/0129761 A1* 5/2014 Kwon ................. G06F 12/0246
711/103
2015/0039814 A1* 2/2015 Lim .................... G06F 12/0246
711/103

(Continued)

*Primary Examiner* — Glenn Gossage
(74) *Attorney, Agent, or Firm* — McClure, Qualey & Rodack, LLP

(57) ABSTRACT

A data storage device and method for operating a non-volatile memory including device based space allocation and host-based mapping table searching. In response to a write command from a host that indicates a write logical address in metadata in the write command, a controller at the device end determines a write physical address and allocates the non-volatile memory to provide a space to store write data at the write physical address. The controller transmits the write physical address to the host so the host can establish a mapping table on the host. When filling a completion queue in the host to inform the host of the finishing or completion of the write command, the controller also returns the write physical address to the completion queue for the host to update the mapping table on the host in real time. The metadata programmed at the device end is read back with the read data for read data verification at the host end. Commands may include write and read descriptors describing where to get the write data from a system memory of the host, or where to store the read data in the system memory of the host. The controller may return metadata read from different spaces of the non-volatile memory to the host to rebuild the mapping table. The non-volatile memory may be flash memory, and the controller may allocate the non-volatile memory for wear-leveling and garbage collection.

12 Claims, 6 Drawing Sheets

(52) U.S. Cl.
CPC .......... *G06F 3/0631* (2013.01); *G06F 3/0659* (2013.01); *G06F 3/0679* (2013.01); *G06F 3/0688* (2013.01); *G06F 12/0253* (2013.01); *G06F 12/0292* (2013.01); *G06F 13/28* (2013.01); *G06F 2212/7202* (2013.01); *G06F 2212/7205* (2013.01); *G06F 2212/7211* (2013.01)

(58) Field of Classification Search
CPC .................. G06F 3/0679; G06F 13/28; G06F 2212/7202; G06F 2212/7205; G06F 2212/7211; G06F 3/0688; G06F 3/0607; G06F 2212/1004; G06F 2212/7201; G06F 2212/7208
See application file for complete search history.

(56) References Cited

U.S. PATENT DOCUMENTS

| | | | |
|---|---|---|---|
| 2016/0292100 A1* | 10/2016 | Olcay | G06F 13/28 |
| 2017/0192902 A1* | 7/2017 | Hwang | G06F 12/0246 |
| 2018/0107592 A1* | 4/2018 | Hashimoto | G06F 3/0619 |
| 2018/0307558 A1* | 10/2018 | Chen | G06F 12/0246 |
| 2019/0004944 A1* | 1/2019 | Widder | G06F 12/0292 |
| 2020/0034287 A1* | 1/2020 | Hashimoto | G06F 3/0643 |

* cited by examiner

DATA STORAGE DEVICE AND METHOD INCLUDING DEVICE OR CONTROLLER-BASED SPACE ALLOCATION AND HOST-BASED MAPPING TABLE SEARCHING

CROSS REFERENCE TO RELATED APPLICATIONS

This Application claims priority of China Patent Application No. 201710907869.8, filed on Sep. 29, 2017, the entirety of which is incorporated by reference herein.

BACKGROUND OF THE INVENTION

Field of the Invention

The present invention relates to data storage devices and operating methods for data storage devices, which may be applied to electronic devices and a data center.

Description of the Related Art

There are various forms of nonvolatile memory (NVM) used in data storage devices for long-term data retention, such as a flash memory, magnetoresistive random access memory (RAM), ferroelectric RAM, resistive RAM, spin transfer torque-RAM (STT-RAM), and so on.

A non-volatile memory is generally linked to a host so that it can be operated by the host. The physical space in the non-volatile memory is dynamically allocated to correspond to logical addresses for host-end identification. The relationship between logical addresses and physical spaces needs to be recorded in a mapping table. How to use computing resources to efficiently establish and manage the mapping table is an important topic in this technological field.

BRIEF SUMMARY OF THE INVENTION

A data storage device in accordance with an exemplary embodiment of the disclosure includes a non-volatile memory and a controller. In response to a write command from a host that indicates a write logical address, the controller at the device end determines a write physical address and allocates the non-volatile memory to provide a space to store write data at the write physical address. The controller transmits the write physical address to the host for the host to establish a mapping table on the host. The mapping table records a mapping relationship between the write logical address and the write physical address. When filling a completion queue in the host to inform the host of the finishing of the write command, the controller also returns the write physical address to the completion queue for the host to update the mapping table in real time. The write logical address is represented by metadata in the write command from the host to be received by the controller, and the controller combines and writes the write data and the metadata to the non-volatile memory.

According to an exemplary embodiment, in response to a read command from the host that indicates a read physical address, the controller reads the non-volatile memory to get and return read data to the host. The read physical address is obtained by the host which searches the mapping table according to a read logical address, and the read logical address is requested by the host itself. A design architecture for device-based space allocation and host-based mapping table searching is disclosed. The controller reads the non-volatile memory for the read data as well as metadata corresponding to the read data, and transmits the read data and the metadata corresponding to the read data to the host to verify the read data on the host based on the metadata returned to the host with the read data.

In another exemplary embodiment of the disclosure, a method for operating a non-volatile memory includes the following steps. In response to a write command from a host that indicates a write logical address, a write physical address is determined and the non-volatile memory is allocated to provide a space in the write physical address to store write data. The write physical address is transmitted to the host to establish a mapping table on the host. The mapping relationship between the write logical address and the write physical address is recorded in the mapping table. When filling a completion queue in the host to inform the host of the finishing of the write command, the write physical address is returned to the completion queue for the host to update the mapping table based on the write physical address returned to the completion queue. The write logical address is represented by metadata in the write command from the host to be combined and written to the non-volatile memory with the write data. In response to a read command from the host that indicates a read physical address, the non-volatile memory is read to return read data to the host, wherein the read physical address is obtained by the host by searching the mapping table according to a read logical address, which is requested by the host. The read data as well as metadata corresponding to the read data is read from the non-volatile memory and transmitted to the host for the host to verify the read data on the host based on the metadata returned to the host with the read data.

In response to a read command from the host that indicates a read physical address, the non-volatile memory may be read to get read data and return the read data to the host. The read physical address is obtained by the host, which searches the mapping table according to a read logical address, and the read logical address is requested by the host. According to the non-volatile memory operating method, a technology of device-based space allocation and host-based mapping table searching is achieved. When filling a completion queue to inform the host of the finishing of the write command, the write physical address is also returned to the completion queue for the host to update the mapping table in real time.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
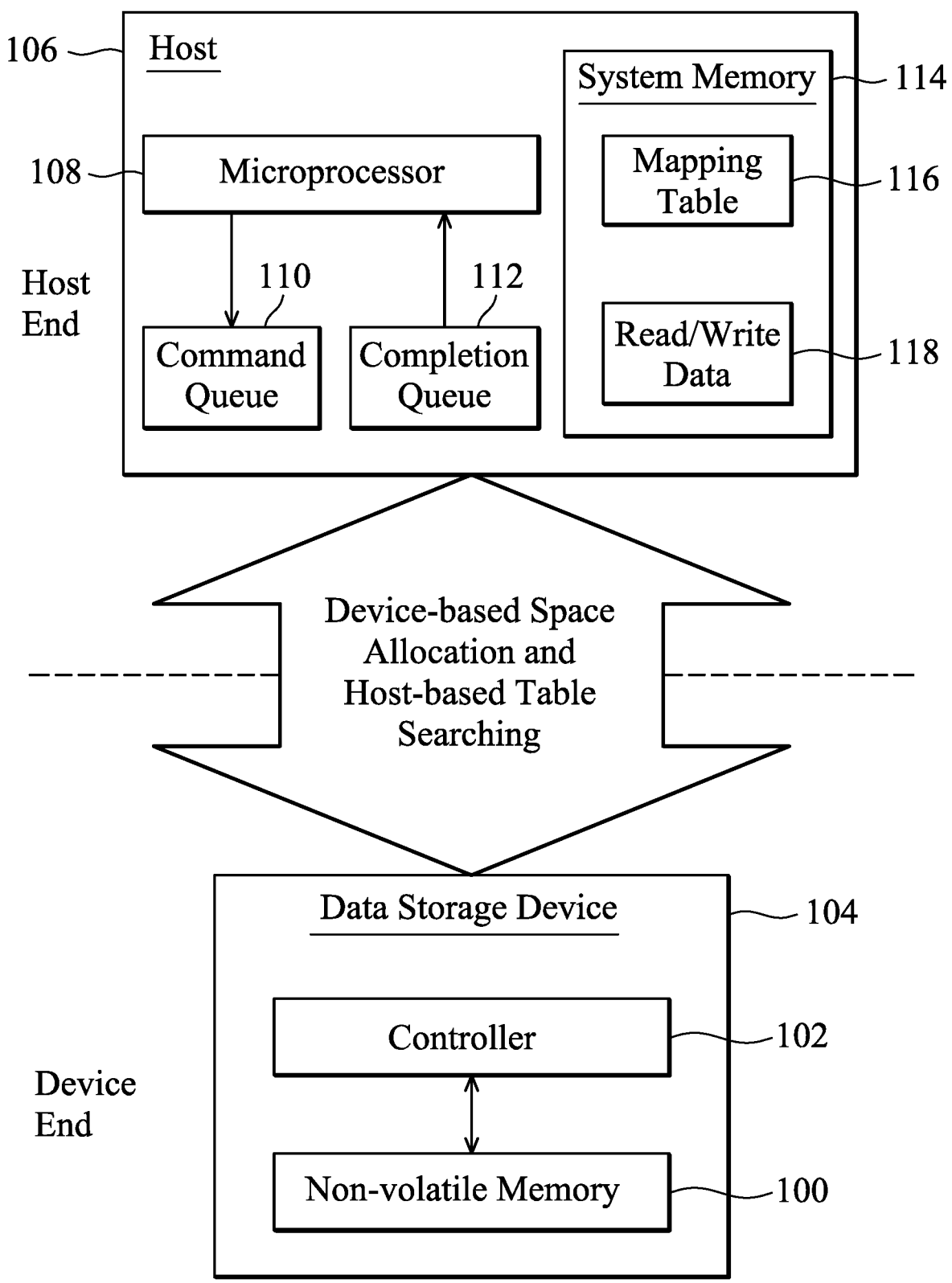
FIG. 1 illustrates an architecture for operating a non-volatile memory 100 in accordance with an exemplary embodiment of the disclosure.

The following description shows exemplary embodiments carrying out the invention. This description is made for the purpose of illustrating the general principles of the invention and should not be taken in a limiting sense. The scope of the invention is best determined by reference to the appended claims.

A non-volatile memory may be a memory device for long-term data retention such as a flash memory, a magnetoresistive RAM, a ferroelectric RAM, a resistive RAM, a spin transfer torque-RAM (STT-RAM) and so on. A non-volatile memory may be used in an electronic device or to build a data center. The following discussion uses flash memory in particular as an example.

Flash memory is often used as a storage medium in today's data storage devices, for implementations of a memory card, a universal serial bus (USB) flash device, an solid state drive (SSD) and so on. In another exemplary embodiment, the flash memory is packaged with a controller to form a multiple-chip package and named e Multi-Media Card™ (eMMC). A data storage device using a flash memory as a storage medium can be applied to a variety of electronic devices, including a smartphone, a wearable device, a tablet computer, a virtual reality device, etc. The computing module within an electronic device may be regarded as a host operating a data storage device equipped on the electronic device.

A flash-based storage media may also be used to build a data center. For example, a server may operate an array of solid state drives (SSDs) to form a data center. The server can be regarded as a host which operates the flash memories on the linked SSDs.

At the host end, the data stored in a flash memory is identified by logical addresses (for example, logical block addresses (LBAs) or global host page numbers (GHPs), etc.) In order to make a full use of the flash memory, the storage space of the flash memory is dynamically allocated to correspond to logical addresses for host-end identification. A flash memory is generally divided into blocks. Each block includes a plurality of pages. Each page may be further divided into a plurality of storage cells. The dynamic configuration and usage of such small units may make the mapping relationship between host-end logical addresses and flash physical space (which may be managed by a mapping table) quite complicated. How to make good use of computing resources to establish and use this mapping table is an important topic in this technical field.

In this paragraph, different situations that operate a flash memory based on a mapping table are discussed. In addition to being a searchable resource for reading data from a flash memory, a mapping table has other functions. In particular, storage space in flash memory needs to be erased in block units before being reused to store new data. Since there is an upper limit to the number of erasures that each block can withstand, the issue of wear leveling has to be considered in the operation of a flash memory. Note that new data is not written over old data. The new data is written to a spare space and the old data is invalidated. The need for garbage collection therefore arises. Sporadic valid data retained in a block can be moved to a spare space via garbage collection technology. The blocks with only invalid data left therein can be erased and reused. Based on the aforementioned discussion, read operations, wear-leveling operations, and garbage collection operations all use the mapping table. Other technologies that promote the efficiency of flash operations may also use the mapping table.

In the disclosure, the mapping relationship between logical address and physical space is established at the device end and sent back to the host and stored at the host end as a mapping table. In this manner, the status of the flash memory is fully considered during the storage space allocation. The resource-consuming applications based on the mapping table are performed by a host to benefit from the strong computing power of the host.

FIG. 1 illustrates an architecture for operating a non-volatile memory 100 in accordance with an exemplary embodiment of the disclosure. A controller 102 is combined with the non-volatile memory 100 to form a data storage device 104. The data storage device 104 is linked to a host 106. The controller 102 has a special design and a driver corresponding to the specially designed controller 102 is loaded onto the host 106 to be executed by the host 106. A technology of device-based space allocation and host-based mapping table searching is disclosed.

The host 106 has a microprocessor 108, a command queue 110, a completion queue 112 and a system memory 114. The commands issued by the microprocessor 108 are queued in the command queue 110, and will be executed by the controller 102 at the device end to operate the non-volatile memory 100. After the execution of the commands, the controller 102 informs the microprocessor 108 by filling the completion queue 112. The system memory 114 may include a dynamic random access memory (DRAM). Read data obtained from the non-volatile memory 100 may be temporarily stored in the system memory 114 through a direct memory access (DMA) technology. The direct memory access (DMA) technology may be also used to transmit write data from the system memory 114 to the non-volatile memory 100. A mapping table 116 is maintained in the system memory 114, which shows the mapping relationship between logical address (for example, logical block address LBA, for host 106 end identification) and physical space of the non-volatile memory 100 (for example, physical blocks numbered by PBAs). Note that the mapping relationship recorded in the mapping table 116 is not set at the host 106 end. The mapping relationship is established at the device end and then transmitted to the host end and updated to or recorded into the mapping table 116.

In an exemplary embodiment, when getting a write command queued in the command queue 110 for the non-volatile memory 100, the controller 102 is also aware of a logical address (e.g. a logical block address LBA) of the write data. The controller 102 allocates a physical space of the non-volatile memory 100 to correspond to the logical address LBA, and returns a physical address (e.g. a physical block address PBA) of the allocated physical space to the completion queue 112 for the microprocessor 108 to modify the mapping table 116. Thus, the mapping relationship between the logical address LBA of the write data and the physical address of the allocated physical space is recorded in the mapping table 116. For the subsequent operations (e.g. reading) of the same logical address LBA, the mapping table 116 is checked by the microprocessor 108 to get the corresponding physical address PBA. The microprocessor 108 writes the physical address PBA gotten from the mapping table 116 to the command queue 110. The controller 102 may get the physical address PBA from the command queue 110 to read the non-volatile memory 100 according to the physical address PBA and transmits the read data to the host 106.

In an exemplary embodiment, the following contents are written to the command queue 110 by the microprocessor 108 for a write command:

- A descriptor, such as a direct memory access (DMA) descriptor, indicating a position in the system memory 114 for the controller 102 to get the write data.
- Metadata, including a logical address (e.g., an LBA) of the write data, a version number of the write data, and/or other attribute information, such as cyclic redundancy code (CRC), a time stamp, etc., about the write data.
- A target zone, specifying which zone of the non-volatile memory 100 is the target for the write operation. For example, the target zone may be specified by a logical unit number (LUN), a channel number, a chip enable (CE) number, etc. . . . . This field helps to write the flash memory 100 by super-page writing. Each super page may involve pages from different blocks.

Based on the contents queued in the command queue 110 as a write command, the controller 102 allocates one portion of the target zone of the non-volatile memory 100 to store the write data. The controller 102 reads the system memory 114 according to the descriptor to get the write data, and combines and writes the write data and the metadata to the allocated portion within the target zone on the non-volatile memory 100. When finishing the write command, the controller 102 writes the following information to the completion queue 112:

- A completion status, indicating whether the controller 102 successfully executed the write command.
- A physical address (such as a physical block address PBA), indicating the space of the non-volatile memory 100 which the controller 102 has allocated to store the write data.

According to the information queued in the completion queue 112, the microprocessor 108 updates the mapping table 116 in the system memory 114 to record the mapping relationship between the logical address LBA and the physical address PBA.

In an exemplary embodiment, the following contents are written to the command queue 110 by the microprocessor 108 for a read command:

- A descriptor, such as a direct memory access (DMA) descriptor, indicating a position in the system memory 114 for the controller 102 to temporarily store the read data retrieved from the non-volatile memory 100.
- A physical address (such as a physical block address PBA), which is a result of table searching that the microprocessor 108 searches the mapping table 116 based on a logical address (such as a logical block address LBA) of the read data.

Based on the contents queued in the command queue 110 as the read command, the controller 102 reads the non-volatile memory 100 according to the queued physical address and temporarily stores the read data to the system memory 114 according to the queued descriptor. When finishing the read command, the controller 102 writes the following information to the completion queue 112:

- A completion status, indicating whether the controller 102 successfully executed the read command.
- Metadata, retrieved from the non-volatile memory 100, which was previously written to non-volatile memory 100 by a write operation. The returned metadata includes a logical address (e.g. an LBA) of the read data, a version number of the read data, and/or other attribute information, such as cyclic redundancy code (CRC), a time stamp, etc . . . , about the read data.

According to the information queued in the completion queue 112, the microprocessor 108 performs error detection on the read data temporarily stored in the system memory 114. For example, the metadata read from the completion queue 112 may be compared with the metadata maintained at the host 106 end. When the metadata read from the completion queue 112 does not match the metadata maintained at the host 106 end, the read data is unreliable.

In an exemplary embodiment, the microprocessor 108 issues a metadata read command (only reading metadata) and writes the metadata read command to the command queue 110. According to the metadata read command, the controller 102 reads all metadata stored in the non-volatile memory 100 or a portion of the metadata stored in the non-volatile memory 100 and writes the metadata to the completion queue 112. Unlike a read command, a metadata read command does not involve the user's data and may be used in rebuilding the mapping table 116. In the metadata completely read from the non-volatile memory 100, logical addresses (e.g., LBAs) corresponding to all physical addresses (e.g., PBAs) are available. The metadata read command may be requested and written to the command queue 110 by the microprocessor 108 during a power-on procedure, or a power recovery procedure (required because of an unexpected power-down event). According to the information returned from the device and stored in the completion queue 112, the microprocessor 108 rebuilds the mapping table 116.

In an exemplary embodiment, a source block to be cleaned by garbage collection is selected at the host 106 end according to the mapping table 116. According to the aforementioned read/write operations, the host 106 reads the non-volatile memory 100 for the valid data contained in the source block and writes the valid data to a spare space (e.g. a destination block) of the non-volatile memory 100. The destination block is allocated by the controller 102 to collect the valid data of the source block. At the host 106 end, the mapping table 116 is modified with the valid data collection. The valid data originally scattered over the source block is changed to map to the destination block. When the mapping table shows that no valid data is mapped to the source block, the source block can be erased for reuse.

In an exemplary embodiment, cold/hot data judgment for wear leveling is performed at the host 106 end. Data frequently modified is named hot data while cold data is not frequently modified. Based on the cold/hot data tag, the controller 102 may allocate the non-volatile memory to store cold/hot data in appropriate blocks according to the erase counts of the blocks. The blocks with higher erase counts may be allocated to store cold data. The blocks with lower erase counts may be allocated to store hot data. As shown, the host 106 and the device 104 jointly provide computing resources for wear leveling.

In an exemplary embodiment, the host 106 is in a multi-core architecture, and provides a dedicated instruction queue and a dedicated completion queue for each microprocessor (or for each execution thread). The device-based space allocation and host-based table searching of the disclosure makes the multi-core host 106 runs simply. The host 106 does not need to consider the allocation rules of the non-volatile memory 100 (for example, writing data to the non-volatile memory 100 in the order of physical addresses)

and the parallel computing capability of the multi-core architecture is not affected. In an exemplary embodiment, the write commands requested in the different execution threads are queued separately in the different command queues to be executed by the controller 102. The allocation rules of the non-volatile memory 100 are considered by the controller 102 at the device end. The controller 102 allocates the non-volatile memory 100 to store write data of the write commands based on the allocation rules of the non-volatile memory 100. The scheduling of multiple execution threads is separated from the physical space allocations of the non-volatile memory 100.

Figure 2:
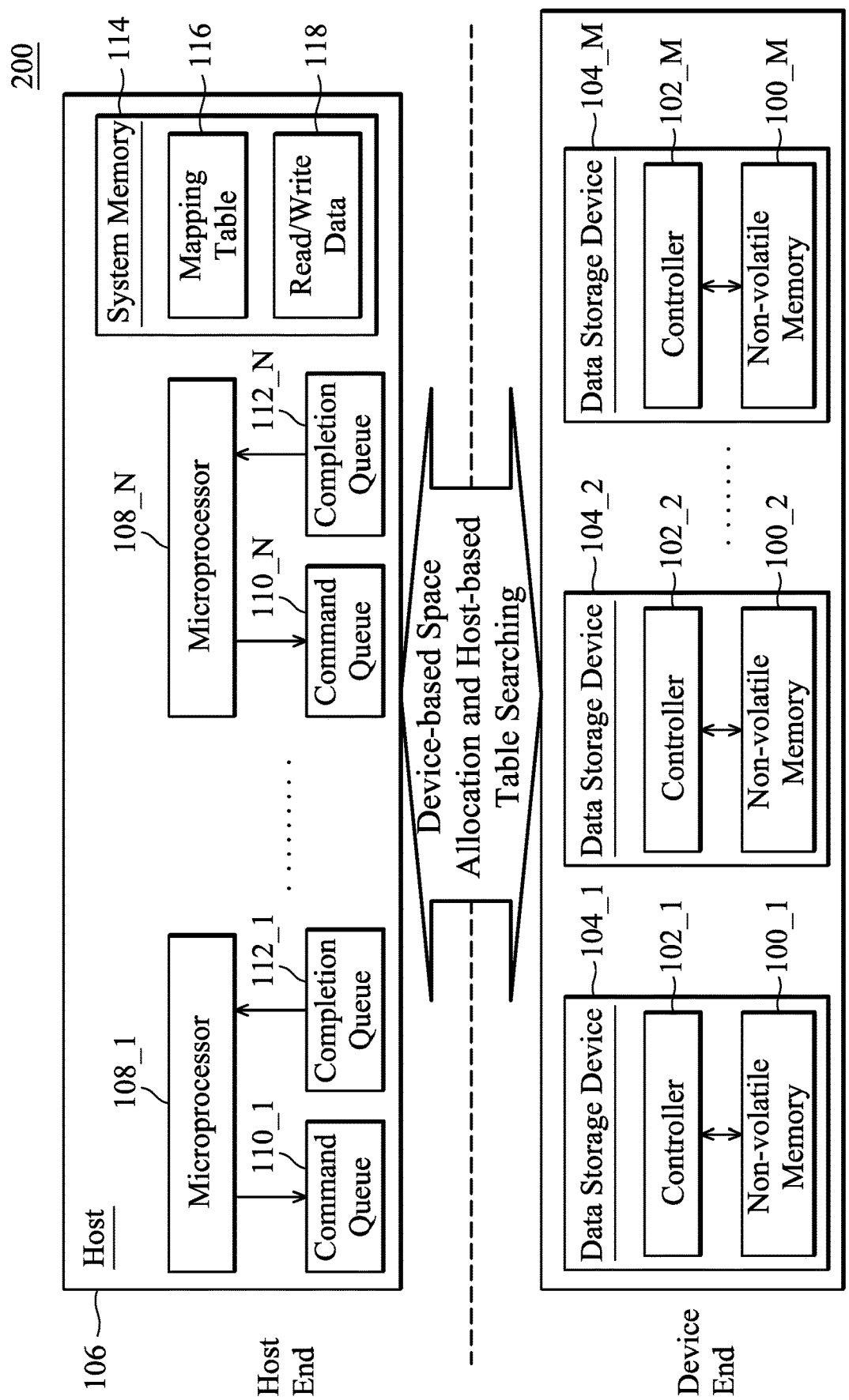
FIG. 2 depicts a data center 200 in accordance with an exemplary embodiment of the disclosure.

FIG. 2 depicts a data center 200 in accordance with an exemplary embodiment of the disclosure. The host 106 may be implemented by a server which is in a multi-core architecture. There are multiple microprocessors 108_1 . . . 108_N (relating to multiple execution threads) and paired command queues 110_1 . . . 110_N and completion queues 112_1 . . . 112_N corresponding to the different microprocessors 108_1 . . . 108_N at the host 106 end. At the device end, there are multiple data storage devices 104_1, 104_2 . . . 104_M. In the data storage devices 104_1, 104_2 . . . 104_M, the non-volatile memories 100_1, 100_2 . . . 100_M are controlled by the dedicated controller 102_1, 102_2 . . . 102_M. The technology of device-based space allocation and host-based table searching of the disclosure makes the controllers 102_1, 102_2 . . . 102_M each simple in design. Specifically, the multi-core computing resources at the host 106 end are not wasted in the space allocation of the non-volatile memories 100_1, 100_2 . . . 100_M.

Figure 3:
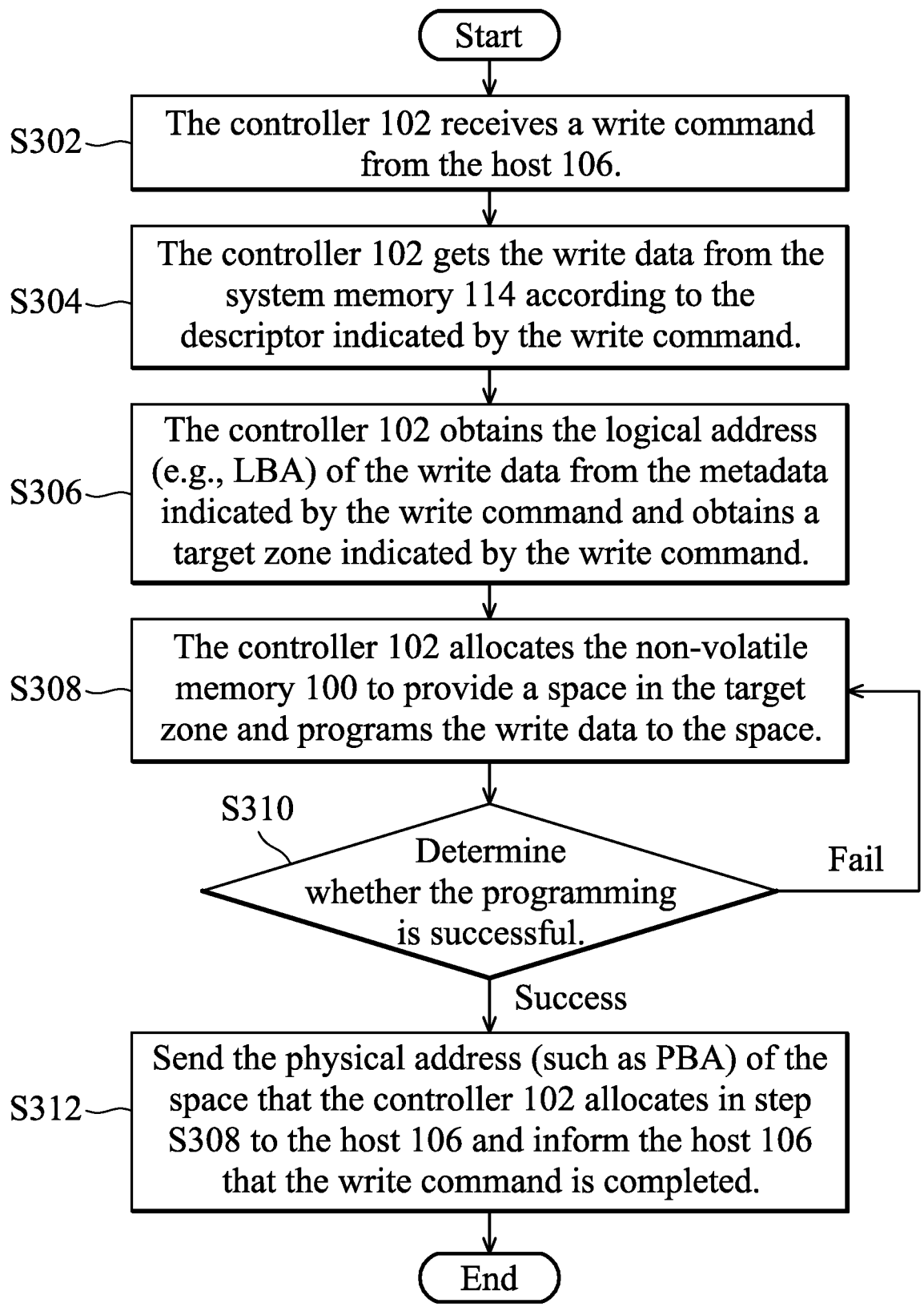
FIG. 3 is a flowchart illustrating how the controller 102 responds to a write command in accordance with an exemplary embodiment of the disclosure.

FIG. 3 is a flowchart illustrating how the controller 102 responds to a write command in accordance with an exemplary embodiment of the disclosure. In step S302, the controller 102 receives a write command from the host 106. In step S304, the controller 102 gets the write data from the system memory 114 according to the descriptor indicated by the write command. In step S306, the controller 102 obtains the logical address (e.g., LBA) of the write data from the metadata indicated by the write command and obtains a target zone indicated by the write command. In step S308, the controller 102 allocates the non-volatile memory 100 to provide a space in the target zone and programs the write data to the space. In step S310, it is determined whether the programming is successful. If unsuccessful (fail), step S308 is performed again and the controller 102 allocates the non-volatile memory 100 to provide another space in the target zone and programs the write data to the new space. If the programming is successful, step S312 is performed to send the physical address (such as PBA) of the space that the controller 102 allocates in step S308 to the host 106 and informs the host 106 that the write command is completed.

Figure 4:
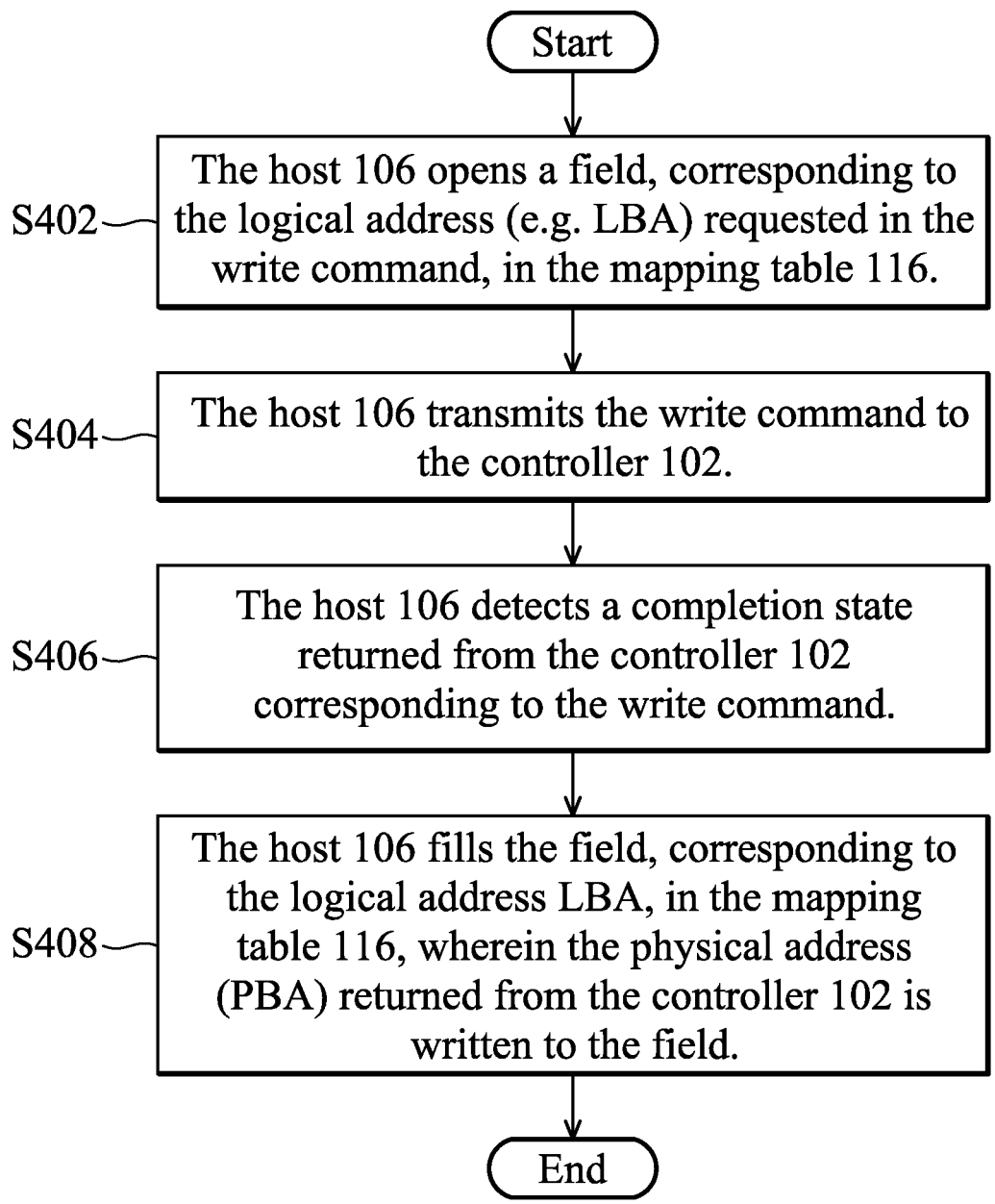
FIG. 4 is a flowchart illustrating how the host 106 operates when a write command is issued in accordance with an exemplary embodiment of the disclosure

FIG. 4 is a flowchart illustrating how the host 106 operates when issuing a write command is issued in accordance with an exemplary embodiment of the disclosure. In step S402, the host 106 opens a field, corresponding to the logical address (e.g. LBA) requested in the write command, in the mapping table 116. In step S404, the host 106 transmits the write command to the controller 102. In step S406, the host 106 detects a completion state returned from the controller 102 corresponding to the write command. In step S408, the host 106 fills the field, corresponding to the logical address LBA, in the mapping table 116. The physical address (PBA) returned from the controller 102 is written to the field.

According to the flowcharts taught in FIGS. 3 and 4, the host 106 and the controller 102 jointly complete a write command on the non-volatile memory 100.

Figure 5:
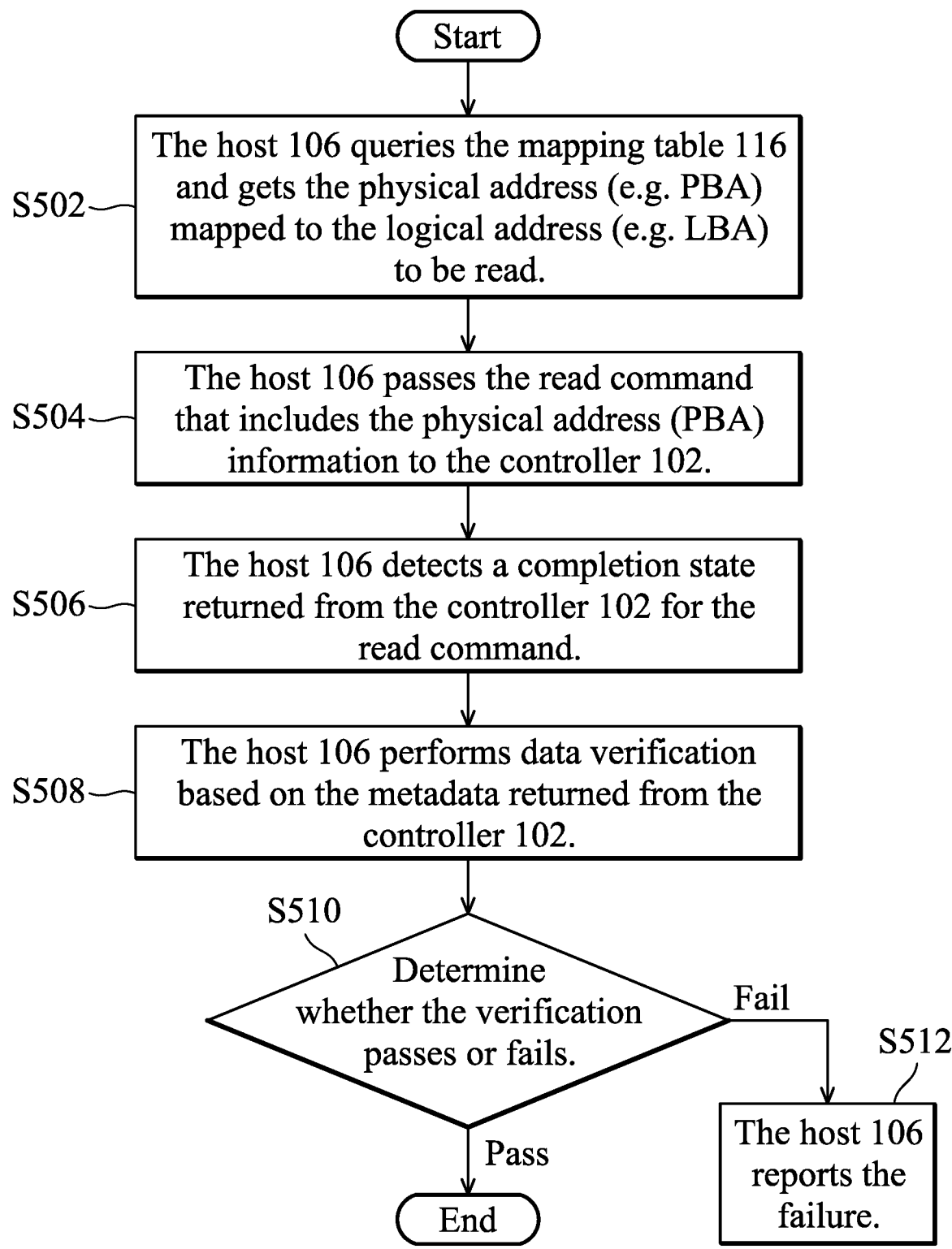
FIG. 5 is a flowchart illustrating how the host 106 operates when a read command is issued in accordance with an exemplary embodiment of the disclosure.

FIG. 5 is a flowchart illustrating how the host 106 operates when a read command is issued in accordance with an exemplary embodiment of the disclosure. In step S502, the host 106 queries the mapping table 116 and gets the physical address (e.g. PBA) mapped to the logical address (e.g. LBA) to be read. In step S504, the host 106 passes the read command that includes the physical address (PBA) information to the controller 102. In step S506, the host 106 detects a completion state returned from the controller 102 for the read command. In step S508, the host 106 performs data verification based on the metadata returned from the controller 102. In step S510, it is determined whether the verification passes or fails. If the verification fails, step S512 is performed, the host 106 reports the failure. When it is determined in step S510 that the verification passes, the flow ends.

Figure 6:
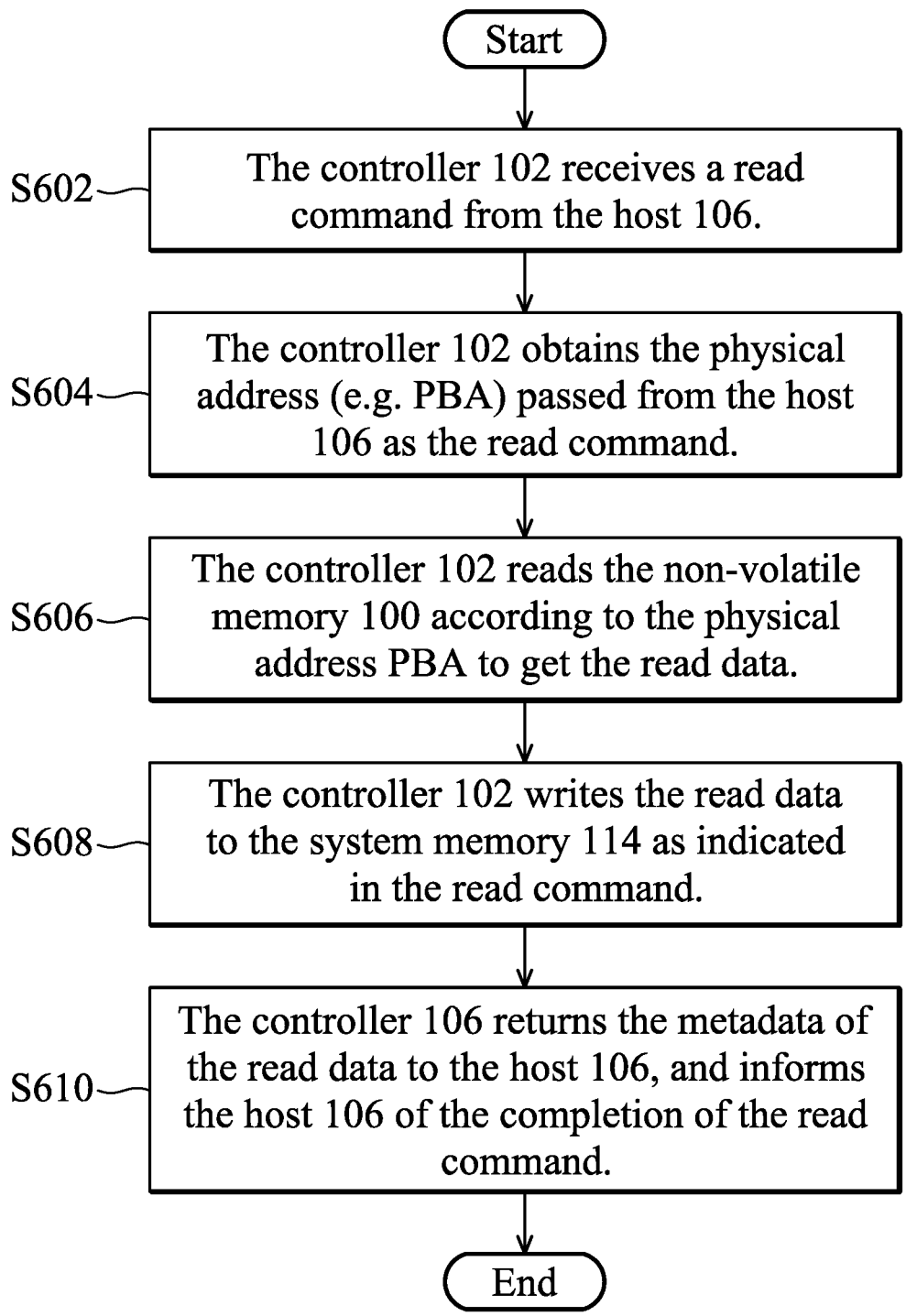
FIG. 6 is a flowchart illustrating how the controller 102 responds to a read command in accordance with an exemplary embodiment of the disclosure.

FIG. 6 is a flowchart illustrating how the controller 102 responds to a read command in accordance with an exemplary embodiment of the disclosure. In step S602, the controller 102 receives a read command from the host 106. In step S604, the controller 102 obtains the physical address (e.g. PBA) passed from the host 106 as the read command. In step S606, the controller 102 reads the non-volatile memory 100 according to the physical address PBA to get the read data. In step S608, the controller 102 writes the read data to the system memory 114 as indicated in the read command. In step S610, the controller 102 returns the metadata of the read data to the host 106, and informs the host 106 of the completion of the read command.

According to the flowcharts taught in FIGS. 5 and 6, the host 106 and the controller 102 jointly complete a read command on the non-volatile memory 100.

Other techniques that use the aforementioned concepts to achieve the device-based space allocation and host-based mapping table searching are within the scope of the disclosure. Based on the above contents, the present invention further relates to methods for operating a non-volatile memory.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
 a non-volatile memory; and
 a controller that, in response to a write command from a host that indicates a write logical address, determines a write physical address and allocates the non-volatile memory to provide a space to store write data at the write physical address, wherein the controller transmits the write physical address to the host for the host to establish a mapping table on the host, the mapping table recording a mapping relationship between the write logical address and the write physical address;
 wherein:
 the controller returns the write physical address to a completion queue in the host when filling the completion queue to inform the host of the completion of the write command, for the host to update the mapping table based on the write physical address returned to the completion queue;

the write logical address is represented by metadata in the write command from the host to be received by the controller, and the controller combines and writes the write data and the metadata to the non-volatile memory;

in response to a read command from the host that indicates a read physical address, the controller reads the non-volatile memory to get and return read data to the host, wherein the read physical address is obtained by the host by searching the mapping table according to a read logical address which is requested by the host; and the controller reads the non-volatile memory for the read data as well as metadata corresponding to the read data, and transmits the read data and the metadata corresponding to the read data to the host to verify the read data on the host based on the metadata corresponding to the read data and returned to the host with the read data.

2. The data storage device as claimed in claim 1, wherein:

in response to a metadata read command from the host, the controller returns sectors of metadata read from different spaces of the non-volatile memory to the host to rebuild the mapping table on the host.

3. The data storage device as claimed in claim 1, wherein:

the write command further indicates a target zone of the non-volatile memory; and the controller determines the write physical address based on the target zone in order to allocate the non-volatile memory to store the write data within the target zone.

4. The data storage device as claimed in claim 1, wherein:

the write command further includes a write descriptor which describes where to get the write data from a system memory of the host;

the controller reads the system memory by direct memory accessing based on the write descriptor to get the write data and write the write data to the non-volatile memory;

the read command further includes a read descriptor which describes where to store the read data to the system memory of the host; and based on the read descriptor, the controller writes the read data retrieved from the non-volatile memory to the system memory by direct memory accessing.

5. The data storage device as claimed in claim 1, wherein:

the non-volatile memory is a flash memory;

for garbage collection, the controller allocates the non-volatile memory to provide a target block to collect valid data of a source block;

the source block is selected from the non-volatile memory by the host based on the mapping table; and the host reads and writes the non-volatile memory to execute the garbage collection.

6. The data storage device as claimed in claim 1, wherein:

the non-volatile memory is a flash memory;

for wear leveling, the controller allocates the non-volatile memory to store cold data in blocks with high erase counts and store hot data in blocks with low erase counts; and the cold data and hot data are judged by the host.

7. A method for operating a non-volatile memory, comprising:

in response to a write command from a host that indicates a write logical address, wherein the write logical address is represented by metadata in the write command from the host, determining a write physical address and allocating the non-volatile memory to provide a space to store write data at the write physical address;

transmitting the write physical address to the host for the host to establish a mapping table on the host, wherein the mapping table records a mapping relationship between the write logical address and the write physical address and the write physical address is returned to a completion queue for the host to update the mapping table based on the write physical address returned to the completion queue in the host when filling the completion queue in the host to inform the host of the completion of the write command;

combining and writing the write data and the metadata to the non-volatile memory;

reading the non-volatile memory to get and return read data as well as metadata corresponding to the read data to the host in response to a read command from the host that indicates a read physical address, wherein the read physical address is obtained by the host by searching the mapping table according to a read logical address which is requested by the host; and verifying the read data on the host based on the metadata corresponding to the read data and returned to the host with the read data.

8. The method for operating a non-volatile memory as claimed in claim 7, wherein:

in response to a metadata read command from the host, sectors of metadata read from different spaces of the non-volatile memory are returned to the host to rebuild the mapping table on the host.

9. The method for operating a non-volatile memory as claimed in claim 7, wherein the write command further indicates a target zone of the non-volatile memory, and the method further comprises:

determining the write physical address based on the target zone in order to allocate the non-volatile memory to store the write data within the target zone.

10. The method for operating a non-volatile memory as claimed in claim 7, wherein the write command further includes a write descriptor which describes where to get the write data from a system memory of the host, and wherein the method further comprises:

reading the system memory based on the write descriptor by direct memory accessing to get the write data and write the write data to the non-volatile memory;

wherein the read command further includes a read descriptor which describes where to store the read data to the system memory of the host, and wherein the method further comprises writing, based on the read descriptor, the read data retrieved from the non-volatile memory to the system memory by direct memory accessing.

11. The method for operating a non-volatile memory as claimed in claim 7, wherein:

the non-volatile memory is a flash memory;

for garbage collection, the non-volatile memory is allocated to provide a target block to collect valid data of a source block;

the source block is selected from the non-volatile memory by the host based on the mapping table; and the host reads and writes the non-volatile memory to execute the garbage collection.

12. The method for operating a non-volatile memory as claimed in claim 7, wherein:
- the non-volatile memory is a flash memory;
- for wear leveling, the non-volatile memory is allocated to store cold data in blocks with high erase counts and store hot data in blocks with low erase counts; and
- the cold data and hot data are judged by the host.

* * * * *